United States Patent
Poublon

[11] Patent Number: 6,088,661
[45] Date of Patent: Jul. 11, 2000

[54] AMBIENT TEMPERATURE LEARNING ALGORITHM FOR AUTOMOTIVE VEHICLES

[75] Inventor: Mark J. Poublon, Shelby Township, Mich.

[73] Assignee: Chrysler Corporation, Auburn Hills, Mich.

[21] Appl. No.: 09/150,416

[22] Filed: Sep. 9, 1998

[51] Int. Cl.[7] .................................................. G01K 1/14
[52] U.S. Cl. ........................ 702/130; 702/99; 374/133; 374/137; 374/144; 73/118.2
[58] Field of Search ................ 702/130, 99; 123/406.55; 374/100, 144, 145, 142, 134, 133, 112, 137; 477/97, 98; 73/118.2

[56] References Cited

U.S. PATENT DOCUMENTS

| | | | |
|---|---|---|---|
| 5,001,656 | 3/1991 | Zimmerman et al. | 364/557 |
| 5,263,462 | 11/1993 | Reddy | 123/520 |
| 5,416,728 | 5/1995 | Rudzewicz et al. | |
| 5,803,608 | 9/1998 | Randoll et al. | 374/144 |

*Primary Examiner*—Marc S. Hoff
*Assistant Examiner*—Hien Vo
*Attorney, Agent, or Firm*—Mark P. Calcaterra

[57] ABSTRACT

An ambient temperature learning algorithm provides a series of ambient temperature estimates which are calculated as a function of the induction air temperature as measured by an induction temperature sensor and this series of estimates is then filtered to provide an accurate reading of the actual ambient temperature. To increase the accuracy of the ambient temperature following an engine-off soak period, the initial estimate of the ambient can be made based upon several criteria. If the engine has not run for several hours, the induction system measurement from which the estimates are made is a good starting value. How long the engine has been off can be determined by a soak timer in the vehicle or by comparing the engine coolant temperature with the induction system temperature. If the coolant and induction system temperatures are very close, the soak period can be assumed long enough for the induction temperature to be a good starting point for the learned ambient temperature. If the soak has not been long, as indicated by either the soak timer or the temperature comparison methods, then the learned ambient from the last drive cycle is a better initial value for the ambient temperature. The algorithm eliminates the need for a separate temperature sensor for measuring the ambient temperature.

12 Claims, 5 Drawing Sheets

AMBIENT TEMPERATURE LEARNING ALGORITHM FOR AUTOMOTIVE VEHICLES

BACKGROUND OF THE INVENTION

FIELD OF THE INVENTION

The present invention relates to engine and vehicle control software, and more particularly to an algorithm for determining the ambient temperature with an induction temperature sensor installed in the engine induction system.

BACKGROUND AND SUMMARY OF THE INVENTION

It is useful for engine and vehicle system control to know various temperatures related to the vehicle operation. Two such temperatures are the ambient temperature of the environment and the temperature in the induction system. The ambient temperature is used for controlling cooling fans for purge systems which capture evaporative emissions, and is provided to the driver in order to provide the driver with the outdoor temperature. The temperature in the induction system is used for controlling the fuel/air system of the engine.

Previously, in order to provide the ambient and induction air temperatures, two separate temperature sensors were installed on the vehicle, one for measuring the ambient temperature, and a second disposed within the induction system for measuring the temperature of the induction air. It is desirable however, to reduce the number of temperature sensors and other electronics required on board the vehicle. Therefore, it is desirable to provide a method of determining the ambient temperature based upon the temperature of the induction air. With one temperature sensor installed in the induction system, the present invention measures the induction system temperature and with the method of the present invention, learns the ambient temperature. Therefore, the need for a second temperature sensor for measuring the ambient temperature is eliminated.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Under low vehicle speed and/or low engine mass flow conditions, the induction system temperature is greatly effected by the under hood temperature. Under high engine mass flow operating conditions without exhaust gas recirculation, however, the induction system temperature converges to the ambient temperature. Using this fact, along with wellknown temperature conversion characteristics for solids from heat transfer theory, a series of estimates of the ambient temperature can be calculated. This series of estimates is then filtered with a simple digital filter to provide an accurate reading of the actual ambient temperature.

Figure 1:
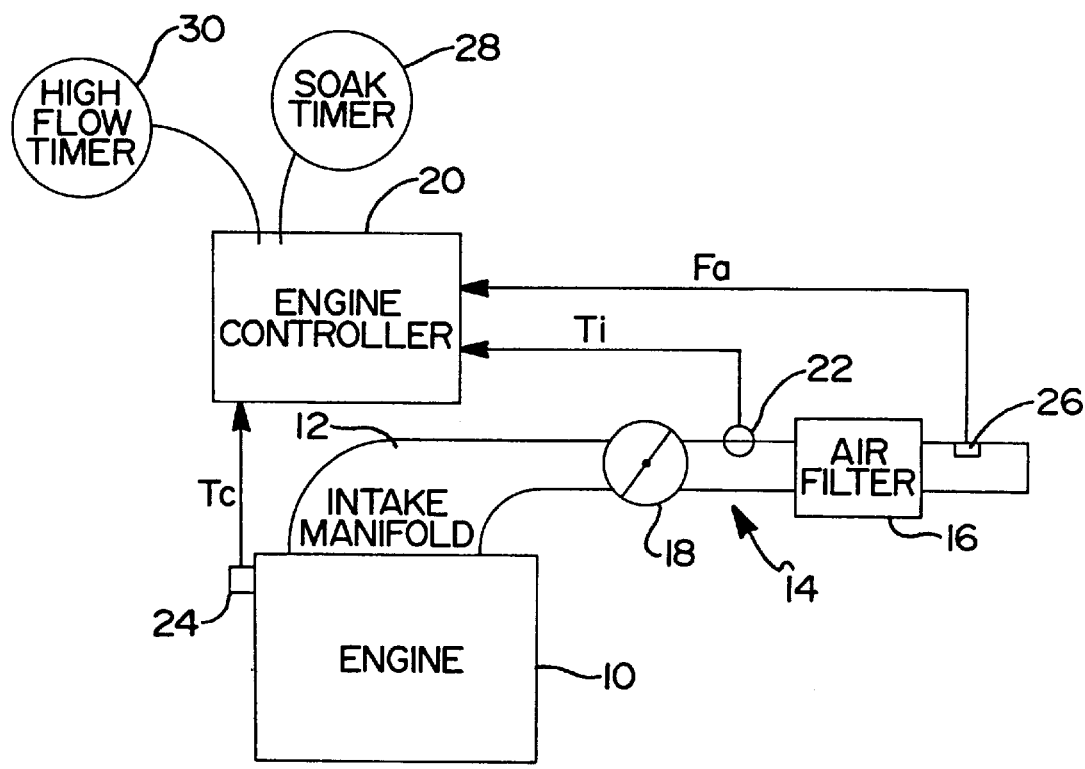
FIG. 1 is a schematic view of an engine having an induction system with a single induction temperature sensor and an engine controller for determining the ambient temperature according to the principles of the present invention.

As shown in FIG. 1, an internal combustion engine 10 is provided with an intake manifold 12 of an air induction system 14. The induction system 14 is provided with an air filter 16 and throttle body valve 18 which controls the flow of air through the induction system 14. An engine controller 20 is provided and, according to the principles of the present invention, receives temperature signals from the induction air temperature sensor 22 and the engine coolant sensor 24. Furthermore, an induction airflow sensor 26 is provided for sensing the flow of air through the induction system 14 and providing a signal Fa to the engine controller 20. Alternatively, a pressure sensor can be provided for sensing the pressure in the intake manifold 12. From the sensed pressure, the airflow through the intake manifold 12 can be determined by known techniques by the engine controller 20.

Under the ambient temperature learning algorithm of the present invention as described in detail below, a series of ambient temperature estimates ($Ta_{est}$) are calculated and this series of estimates is then filtered to provide an accurate reading of the actual ambient temperature ($Ta_{learned}$). To increase the accuracy of the ambient temperature following an engine-off soak period, the initial estimate of the ambient can be made based upon several criteria. If the engine has not run for several hours, the induction system measurement from which the estimates are made is a good starting value. How long the engine has been off can be determined by a soak timer in the vehicle or by comparing the engine coolant temperature with the induction system temperature. If the coolant and induction system temperatures are very close, the soak period can be assumed long enough for the induction temperature to be a good starting point for the learned ambient temperature. If the soak has not been long, as indicated by either the soak timer or the temperature comparison methods, then the learned ambient from the last drive cycle is a better initial value for the ambient temperature.

Figure 2:
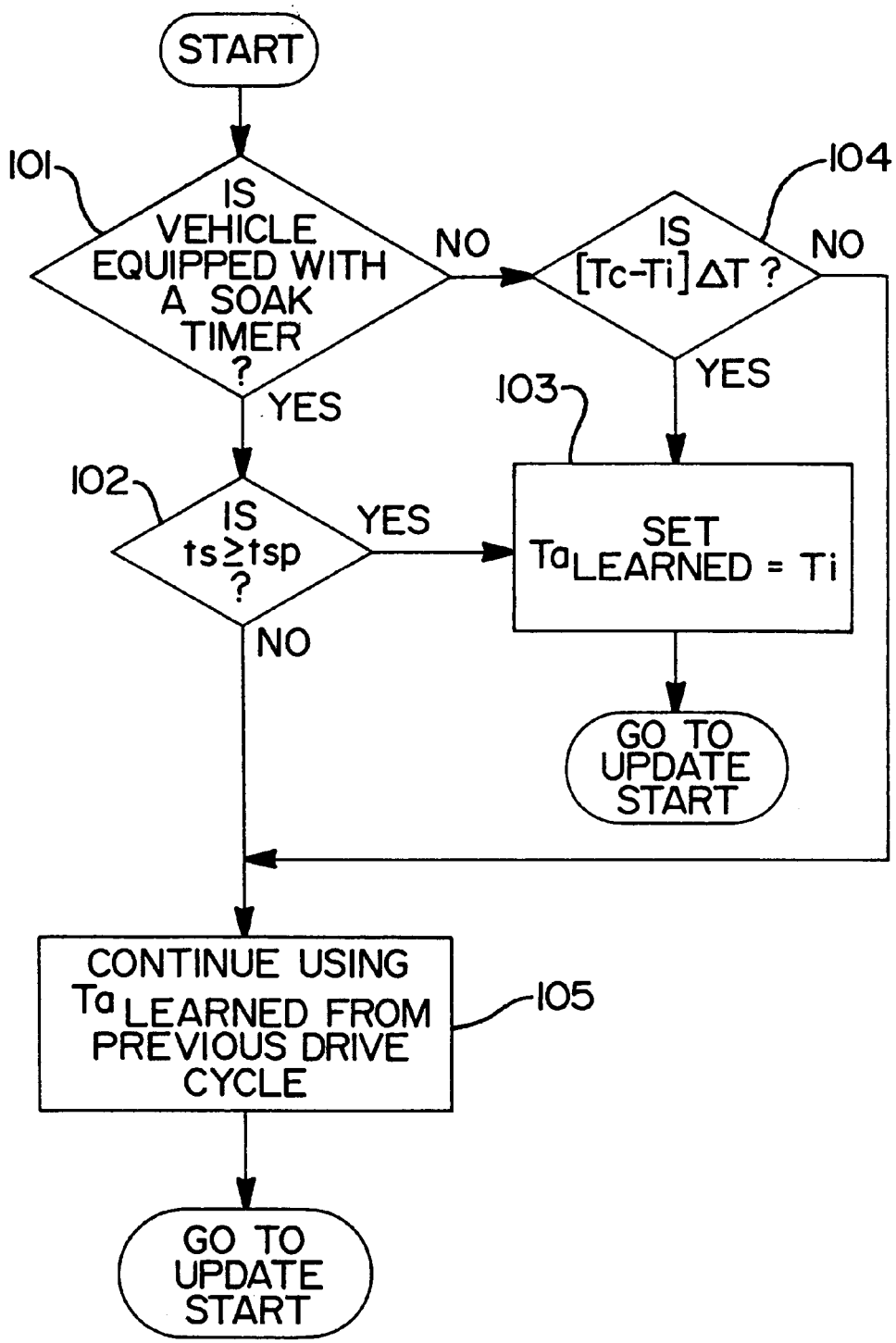
FIG. 2 is a flowchart of the ambient temperature learning algorithm according to the principles of the present invention.
Figure 3:
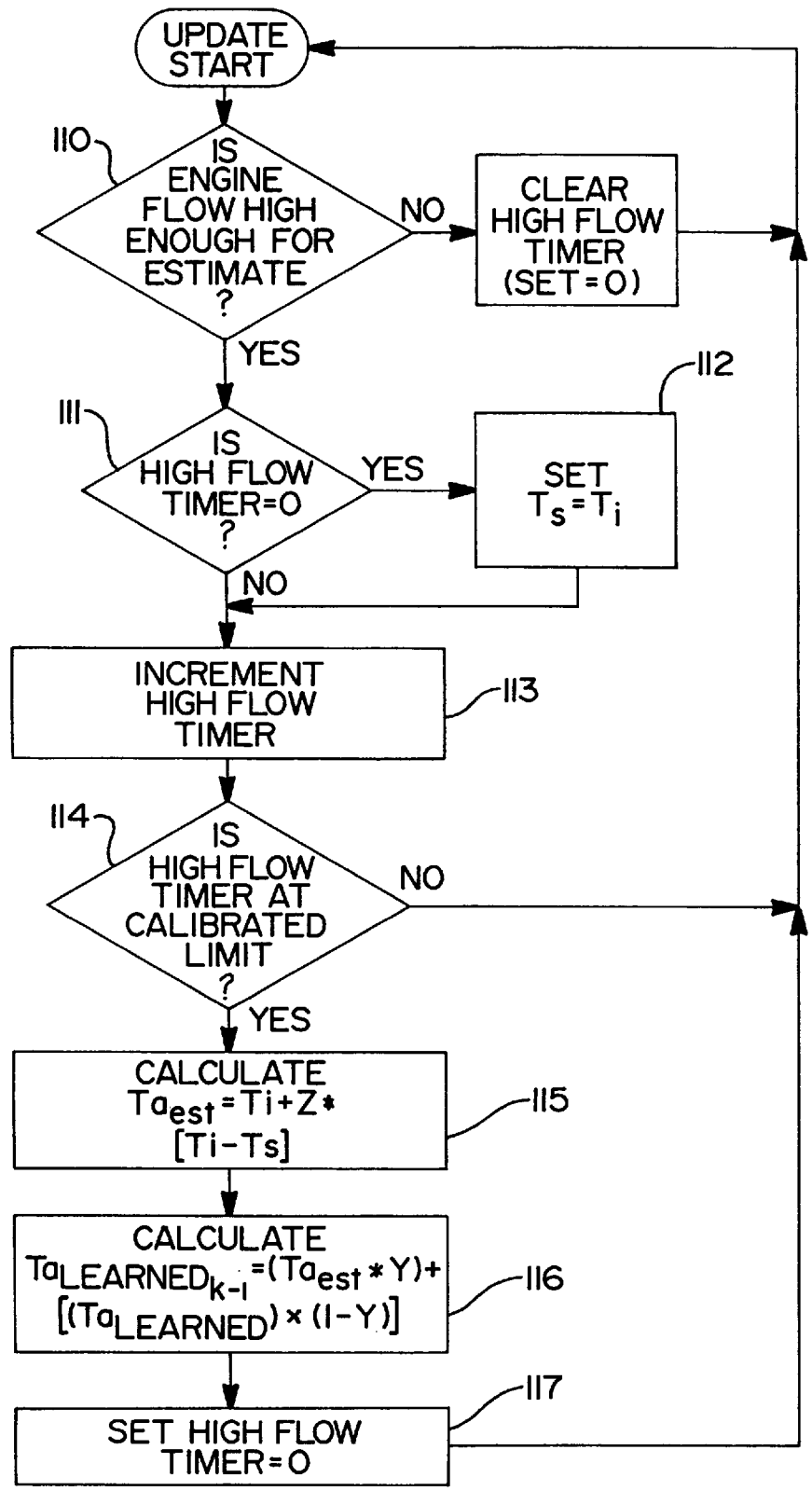
FIG. 3 is a flowchart of the update ambient temperature algorithm according to the principles of the present invention.

With reference to FIGS. 2 and 3, the flowchart for the ambient temperature learning algorithm according to the principles of the present invention will be described. As shown in FIG. 2, the control algorithm determines whether the vehicle is equipped with a soak timer at Step 101. A soak timer is provided within the vehicle or engine controller and detects the amount of time (soak time $t_s$) that the vehicle has been turned off. For example, the soak timer 28 can be embodied within the engine controller 20 as illustrated in FIG. 1. If it is determined in Step 101 that the vehicle is equipped with a soak timer, the algorithm flow proceeds to Step 102 where it is determined whether the soak time $t_s$ is greater than, or equal to, a predetermined soak time $t_{sp}$. The predetermined soak period $t_{sp}$ is indicative of the amount of time that it takes for the vehicle engine compartment to cool down to ambient temperature. If it is determined that the soak time $t_s$ is greater than or equal to the predetermined soak period $T_{sp}$, the flow proceeds to Step 103 where the learned ambient temperature $Ta_{learned}$ is set equal to the induction temperature Ti. If in Step 101 it is determined that the vehicle is not equipped with a soak timer, the algorithm flow proceeds to Step 104 where it is determined if the engine coolant temperature Tc is within a predetermined range of the induction temperature Ti. In other words, it is determined whether $|Tc-Ti|<\Delta T$, where $\Delta T$ is a predetermined temperature range. If so, the algorithm proceeds to Step 103 where the learned ambient temperature $Ta_{learned}$ is set equal to the induction temperature Ti. If it is determined in Step 104 that the engine coolant temperature Tc is not within a predetermined range of the induction temperature Ti, then the flow proceeds to Step 105. In Step 105, the learned ambient temperature control algorithm decides to use the learned ambient temperature from the previous drive cycle as the present learned ambient temperature $Ta_{learned}$. Likewise, in Step 102, if it is determined that the soaked time $t_s$ is not greater than or equal to the predetermined soak period $t_{sp}$, then flow continues to Step 105 wherein the learned ambient temperature $Ta_{learned}$ is set from the previous drive cycle. After Steps 103 and 105, flow continues to the update flow algorithm shown in FIG. 3.

With reference to FIG. 3, in Step 110, it is determined whether the engine flow is high enough for producing an estimate. According to this step, the flow sensor 26 provides a signal Fa to the engine controller 20. If the engine flow Fa is determined to be high enough for an estimate, the algorithm proceeds to Step 111 where it is determined if the high flow timer is equal to zero. A high flow timer 30 is provided in the engine controller 20 and is provided for instituting a delay between calculations of the learned ambient temperature. If it is determined at Step 111 that the high flow timer is equal to zero, flow proceeds to Step 112 where a start temperature Ts is set equal to the induction temperature Ti. If it is determined in Step 111 that the high flow timer is not equal to zero, as well as after Step 112, the algorithm continues to Step 113 where the high flow timer is incremented. The algorithm flow then continues to Step 114. At Step 114, it is determined if the high flow timer is at the calibrated limit. If the high flow timer is not at the calibrated limit, flow returns to Step 110. If in Step 114 it is determined that the high flow timer is at the calibrated limit, the algorithm flow continues to Step 115 where an estimated ambient temperature $Ta_{est}$ is calculated according to the equation:

$$Ta_{est}=Ti+z*(Ti-Ts) \quad (1)$$

where z is a calibrated constant. After Step 115, the algorithm flow continues to Step 116 where the learned ambient temperature from the present cycle $Ta_{learned}$ is calculated according to the equation:

$$Ta_{learned}^K=(Ta_{est}*y)+[(Ta_{learned}^{K-1})*(1-y)] \quad (2)$$

where y equals a calibrated constant and k is a counter so that $Ta_{learned}^{K-1}$ is the previous learned ambient temperature value.

Accordingly, the learned ambient temperature is then determined for use by the various vehicle systems.

At Step 117, the high flow timer is set to zero, and the flow returns to Step 110 to begin another calculation cycle.

Figure 4:
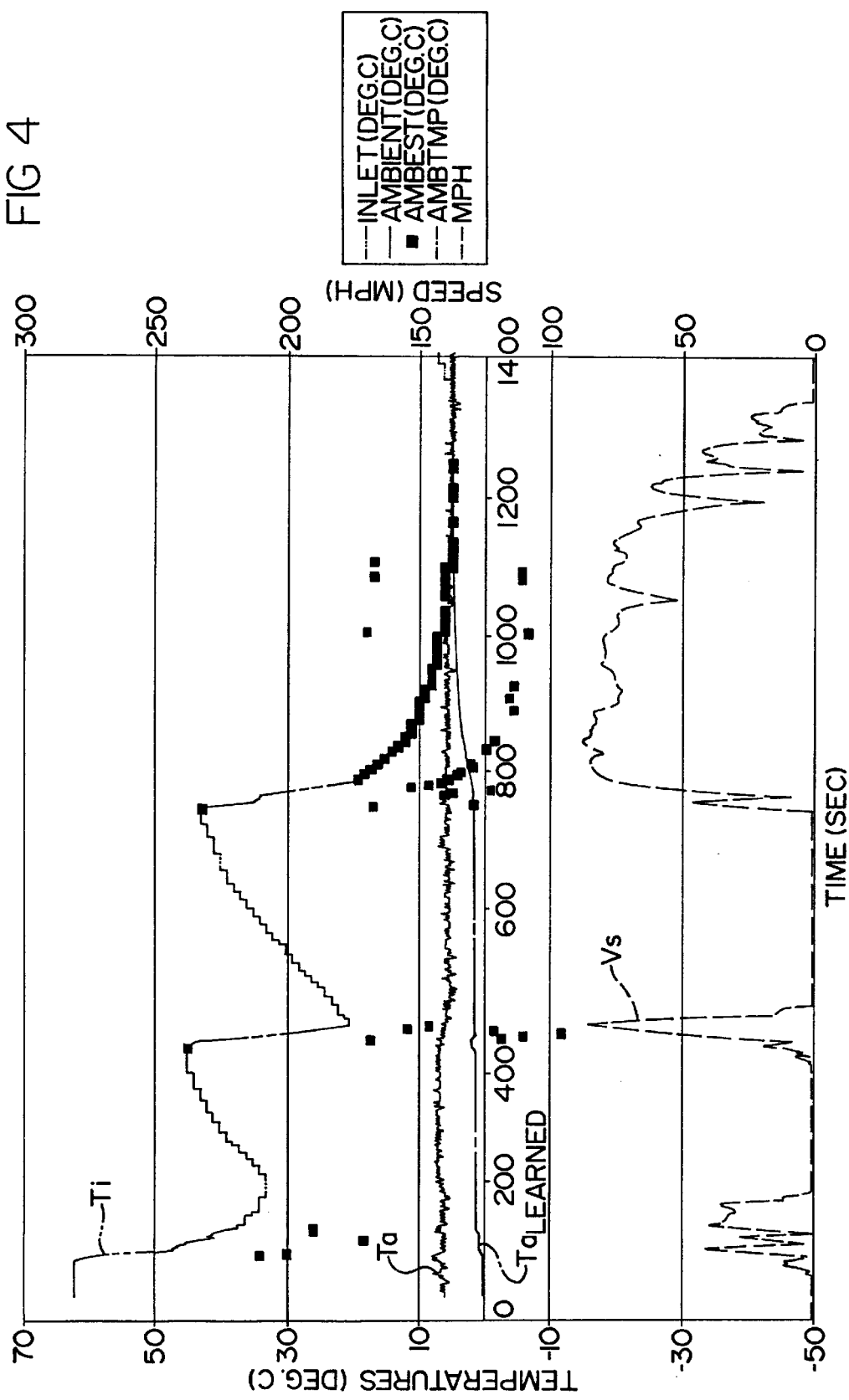
FIGS. 4 and 5 are graphical illustrations of the learned ambient temperature calculated over time based upon measured induction temperature.
Figure 5:
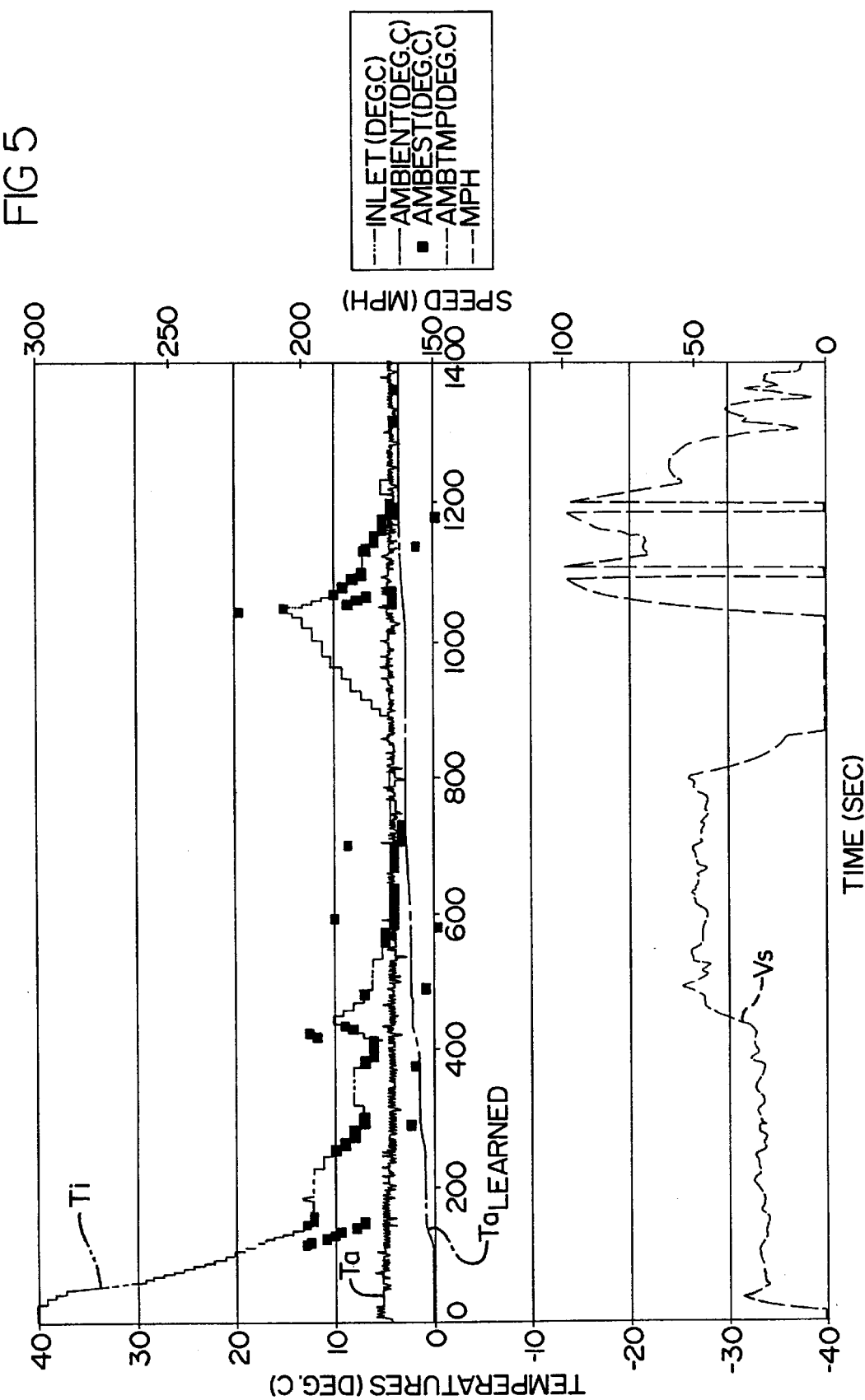

With reference to FIGS. 4 and 5, test data showing the actual ambient temperature Ta, the induction temperature Ti, and the learned ambient temperature $Ta_{learned}$ are shown over time along with the estimated ambient temperature $Ta_{est}$ shown by square data points being illustrated over time along with the vehicle speed depicted along the right hand side of the graph. With reference to FIG. 4, at initial start up, the actual ambient temperature Ta is approximately seven degrees Celsius as measured by an ambient temperature sensor provided for testing purposes. The induction temperature Ti is initially approximately 60 degrees Celsius, and upon the vehicle speed increasing in approximately the 70 to 200 second time period, the induction temperature Ti decreases as the air flow increases. At approximately 200 seconds, the vehicle is brought to a stop and the induction temperature Ti gradually increases as the engine temperature and temperature of the engine compartment increase due to the low air flow of the induction system. At approximately 400 seconds, the vehicle speed is greatly increased and the induction temperature Ti decreases due to the increasing air flow in the induction system. Then, as the vehicle is brought to a stop where the vehicle speed equals zero, the induction temperature again increases until approximately 750 seconds where the vehicle speed again increases and the induction temperature decreases and approaches ambient temperature at approximately the 1000 second mark.

The learned ambient temperature $Ta_{learned}$ is, for purposes of this example, initially set at zero degrees Celsius, several degrees below the actual ambient temperature, in order to more clearly illustrate the effectiveness of the algorithm of the present invention. It should be understood that the initial learned ambient temperature would typically be a closer approximation of the actual ambient temperature. The learned ambient temperature $Ta_{learned}$ is repeatedly calculated during the operation of the vehicle where ambient estimated temperature values are calculated only during the time periods when the vehicle speed is sufficient so that the air flow levels are high enough for estimates to be taken. At approximately the 750 second mark, sufficient data is available on a regular basis in order to provide sufficient data for the learned ambient temperature to converge toward the ambient temperature Ta at approximately the 1100 second mark.

A second set of data is shown in FIG. 5 where the vehicle speed is more consistent during the first 800 seconds so that numerous readings can be taken initially so that the learned ambient temperature can be approximated more quickly and the learned ambient temperature more closely approximates the actual ambient temperature Ta more quickly and accurately. It should be noted that from experimental data, the calibration values z and y as provided in equations (1) and (2) can be adjusted to accurately depict the appropriate learned and ambient temperature with respect to specific vehicle applications.

The learned ambient temperature determination algorithm of the present invention is modularized in order to be used with vehicles either equipped with a soak timer or without. Thus, the modularized learned ambient temperature algorithm can be implemented with a controller regardless of whether the vehicle is equipped with such a soak timer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining ambient temperature from an engine induction system temperature sensor, comprising the steps of:

determining if an engine air induction flow exceeds a predetermined value;

measuring an induction air temperature;

updating a learned ambient temperature value as a function of the induction air temperature.

2. The method according to claim 1, further comprising the step of determining if the vehicle has been turned off for a predetermined soak period indicative of a time period for the engine and engine compartment to reach ambient temperature, and if so, setting an initial learned ambient temperature equal to said induction temperature.

3. The method according to claim 2, wherein if the vehicle has not been turned off for said predetermined soak period, a learned ambient temperature from a previous drive cycle is used as an initial learned ambient temperature.

4. A method of determining ambient temperature from an engine induction system temperature sensor, comprising the steps of:

determining if a vehicle has sat long enough for the vehicle temperature to reach approximately ambient temperature and if so, setting an initial learned ambient temperature equal to an induction air temperature as detected by an induction temperature sensor;

determining if an engine air induction flow exceeds a predetermined value;

measuring a temperature of induction air; and updating the learned ambient temperature value as a function of the induction air temperature.

5. The method according to claim 4, further comprising the step of determining if the vehicle has been turned off for a predetermined soak period indicative of a time period for the engine and engine compartment to reach ambient temperature, and if so, setting an initial learned ambient temperature equal to said induction temperature.

6. The method according to claim 5, wherein if the vehicle has not been turned off for said predetermined soak period, a learned ambient temperature from a previous drive cycle is used as an initial learned ambient temperature.

7. A method of determining ambient temperature from an engine induction system temperature sensor, comprising the steps of:

determining if an engine air induction flow exceeds a predetermined value and setting a start temperature value Ts equal to a measured induction temperature value Ti;

executing a predetermined delay period;

calculating an estimate ambient temperature Taest according to the equation, $$Ta_{est} = Ti + z * [Ti - Ts]$$

where z is a constant; and calculating a learned ambient temperature value $Ta_{learned}$ according to the equation, $$Ta_{learned} = [Ta_{est} * y] + [Ta_{learned}\ \text{previous} * (1-y)]$$

where y is a constant and $Ta_{learned}$ previous is a previous learned ambient temperature value.

8. The method according to claim 7, further comprising the step of determining if the vehicle has been turned off for a predetermined soak period indicative of a time period for the engine and engine compartment to reach ambient temperature, and if so, setting an initial learned ambient temperature $Ta_{learned}$ equal to said induction temperature Ti.

9. The method according to claim 8, wherein if the vehicle has not been turned off for said predetermined soak period, a learned ambient temperature $Ta_{learned}$ from a previous drive cycle is used as an initial learned ambient temperature.

10. The method according to claim 7, further comprising the step of determining if an engine coolant temperature Tc is within a predetermined temperature range of said induction temperature Ti, and if so, setting an initial learned ambient temperature $Ta_{learned}$ equal to said induction temperature Ti.

11. The method according to claim 10, wherein if said engine coolant temperature Tc is not equal to said induction temperature Ti, a learned ambient temperature $Ta_{learned}$ from a previous drive cycle is used as an initial learned ambient temperature.

12. A system for determining ambient temperature from an induction air temperature sensor, comprising:

an internal combustion engine including an induction air passage;

an induction air temperature sensor disposed in said induction air passage; and calculating means for calculating a learned ambient temperature as a function of a measured induction air temperature as measured by said induction air temperature sensor.

* * * * *